Fig.1.

Feb. 17, 1931. L. F. BOLLMEIER ET AL 1,792,529
BEET HARVESTING MACHINE
Filed Aug. 1, 1928 6 Sheets-Sheet 2

Inventor
L.F.Bollmeier
R.P.Colwill
By Hiram A. Sturges
Attorney

Feb. 17, 1931.   L. F. BOLLMEIER ET AL   1,792,529
BEET HARVESTING MACHINE
Filed Aug. 1, 1928   6 Sheets-Sheet 5

Inventor
**L.F.Bollmeier
R.P.Colwill**
By Hiram A. Sturges  Attorney

Patented Feb. 17, 1931

1,792,529

UNITED STATES PATENT OFFICE

LOUIS F. BOLLMEIER AND RICHARD P. COLWILL, OF OMAHA, NEBRASKA

BEET-HARVESTING MACHINE

Application filed August 1, 1928. Serial No. 296,718.

This invention relates to a beet harvesting machine, and has for its object, broadly, to provide a machine which will dig the beets, elevate them to a table, remove their tops or leaves and deliver them while the machine moves forwardly over a row of the beets, operation being effected by the mechanism and no manual control being required except that the driver steers the machine or vehicle.

The invention includes a stationary operating platform on which each beet is gripped, when elevated, its leaves or top removed, and moved to a carrier or conveyor, the power desired for operation being one of the wheels or traction-wheel of the vehicle.

One of the objects of the invention is to provide a convenient means for changing the speed of the gripping-members for the beets and the carrier which elevates the beets to the operating table relative to the speed of the traction wheel so that all of the beets in a row may be harvested, whether disposed closely adjacent to each other or widely separated.

The invention includes an elevator or carrier which will receive the beets in succession in an upright position and will control their movements so that they will be presented with their roots to the rear upon the operating table ready to be moved and gripped, ready for removal of their tops, the movements of the beets on the operating table being timed by and corresponding in speed to the movements of the beets on the elevator.

Also the invention includes a knife of such arrangement that the head of each beet may be severed nearer to its body or nearer to its leaves, this being of advantage since the heads of the beets in some fields are short and in other fields are withered and elongated.

The invention includes automatic means for coupling the driving mechanism with the operating mechanism and for uncoupling the same when driving the vehicle upon highways, or from one field to another or when "turning about" at the end of a row.

With the foregoing objects in view and others to be mentioned hereinafter, the invention presents a new and useful construction, combination and arrangement of parts as described herein and claimed and as illustrated in the accompanying drawings, it being understood that changes may be made in form, size, proportion and minor details, said changes being determined by the scope of the invention as claimed.

In the drawing, Figs. 6 and 7 are detail views.

Referring now to the drawing for a more particular description the invention is shown and described in connection with a vehicle having a frame 10, a rear axle 11 of crank-form journalled in the frame and adapted to be rotated in an arc of 45 degrees, more or less by use of a hand lever 12, the operator occupying a driver's seat 13. The rear wheels 14 are mounted to rotate on said axle.

In order that power may be provided for elevating the beets and removing their tops or leaves and otherwise disposing of them, certain mechanism is employed, including a sprocket wheel 15 which is mounted on the hub of one of the vehicle wheels 14, said sprocket wheel being provided with a sprocket chain 16 which engages a second sprocket wheel 17 which is mounted as an idler on the stub-shaft 18 which projects outwardly from a part of the vehicle axle 11. Numeral 19 indicates a third sprocket wheel which is mounted on the stub-shaft 18. It is provided with a sprocket chain 20 which engages a sprocket wheel 21 rotatable with a stub-shaft 22 having bearings in the vehicle frame rearwardly of the axle 11.

The wheels 17 and 19 are each provided with a clutch-member 23 adapted to be disposed in engagement when said wheels are moved toward each other on the shaft 18, and during the operation of harvesting beets the wheel 19 is rotated by the rotation of the wheel 17, the clutch-members being in engagement. Also when driving the vehicle on a highway or from one field to another the clutch-members are disengaged so that the mechanism required for the harvesting will not be actuated but will remain at rest.

The beet-digger or plow consists of a pair of inclined wings 24 disposed opposite to each other and supported by a pair of arms 25 which project downwardly from the vehicle frame.

We provide a carrier-frame rearwardly of the digger or plow which preferably consists of a plurality of rods 26, their front, lower ends being mounted on a cross-frame 27 which extends downwardly from and is secured to the vehicle frame, said cross-frame also providing bearings for a sprocket wheel 28 disposed immediately at the rear end of the plow, said wheel being engaged by a sprocket chain 29 provided with lugs or projections 30, said chain operating as a carrier for conducting the beets upwardly from the plow, and the lugs 30 being adapted to engage and support the beets during their upward sliding movements on the rods 26. The upper ends of the rods 26 are secured to the vehicle frame.

The sprocket chain 29 is moved by actuation of a gear wheel 31 which is mounted on a rotatable shaft 32 having bearings in the vehicle frame. It will be seen that the shaft 32 is provided with a sprocket wheel 33 which the sprocket chain 29 engages and that the stub-shaft 22 is provided with a gear wheel 34 engaging the gear wheel 31.

As thus described it will be seen that a forward movement of the vehicle may cause the beets of a row to become dislodged from the ground, said beets being carried upwardly and rearwardly upon the inclined carrier-frame 26 by action of the sprocket chain 29 and lugs 30. While we have shown and prefer to use the several sprocket wheels, chains and shafts mentioned we do not wish to limit ourselves to this exact construction, and may substitute other means to accomplish the same result.

Numeral 36 indicates a horizontal circular platform which is mounted on the vehicle frame rearwardly of the axle 11. This platform is provided with an upright stop-rim 37 at its periphery and circularly disposed rods 38 inwardly of said rim, and thereby providing circularly disposed passageways 39, the remaining part of the platform being a floor or cover 40.

As thus described, the platform is stationary with the vehicle frame. It is covered in part by its floor and the passageways 39 open at its top, also it will be seen that the floor and rods are so disposed that the platform may be said to be of cone-shape; that is to say, the top of the circular platform has a slight inclination from its center toward its circumference.

Numeral 41 indicates a vertical spindle which traverses the circular platform 36 at its center, the lower end of the spindle being provided with a miter gear wheel 42. At 43 is indicated a shaft in bearings having a miter gear wheel 44 in engagement with the miter gear wheel 42, said shaft 43 being also provided with a sprocket wheel 45. Numeral 46 indicates a sprocket wheel which is mounted on the stub-shaft 22 and a sprocket chain 47 is in engagement with the sprocket wheels 45 and 46.

Secured to the upper end of the spindle 41 are a pair of horizontal arms 48 each provided with downwardly projecting fingers 49, each provided at its front with a leaf-spring 50.

Numerals 51 indicate the three arms of a spider, these arms being mounted at their inner ends in a hub 54 which is mounted as an idler on the spindle 41. Each arm of the spider is provided with a sleeve 55 adapted to have rotatable movements thereon; and each sleeve is provided with curved gripping-members or fingers 56.

As thus described, when the vehicle moves forwardly the spindle 41 will revolve in the direction of the arrow shown in the drawings and in operation, the beets will be delivered to the platform by the inclined carrier 29 and will be moved on the floor or cover 40 and upon the curved rods 38 by the fingers 49 of the pair of arms 48.

It will be understood that the driving mechanisms for the carrier 29 and driving mechanisms for the spindle 41 are of such proportion that when a beet is delivered to the platform it will be immediately moved by operation of the fingers of one of the arms 48 and when a second beet is delivered to the platform it will be moved by the fingers 49 of the other arm 48 of said pair. In other words the gear ratios of said driving mechanisms have been "timed" relative to each other to attain this result.

It is understood, of course, that if the beets of the rows are located closer together than usual means should be provided for increasing the speed of the driving mechanisms mentioned relative to the speed of the vehicle, and therefore we provide a mounting for the sprocket wheel 21 that it may be readily removed from the stub-shaft 22 to permit another sprocket wheel to be substituted.

It is obvious that if a sprocket wheel of lesser diameter be substituted for the sprocket wheel 21, the speed of the carrier 29 and spindle 41 will be increased, and we provide sprocket wheels of various diameters to be used as a substitute for the sprocket wheel 21, the sprocket chains 20 being of suitable lengths, and depending upon the diameters of the sprocket wheels 21.

It should be stated that sugar-beets in the several rows of a field are generally spaced at approximately uniform distances from each other to permit full development in their growth, and therefore the adjustments mentioned are not often required.

Numeral 57 indicates a knife which is disposed adjacent to the rim 37 of the platform, said knife being adjustably mounted so that it may be disposed closely adjacent to the rim or somewhat further therefrom, and in instances where the leaves of the beets are set close to the body-portions, the knife is disposed closely adjacent to the rim, but if it is found that the beets in a field have elongated withered necks, the knife is so adjusted that it will be disposed inwardly of the rim and somewhat remote therefrom.

In operation, the plow dislodges the beets from the ground while moving forwardly, the beets being disposed in upright positions ready to be received by the carrier.

The lugs 30 support the beets in an upright position while the carrier 29 conducts them upwardly toward the platform. During this movement for each beet the leaves will engage a buffer-member 58 which is secured to the vehicle frame and which is disposed above the carrier-frame 27 near the edge of the platform 36, this engagement causing the beet to be disposed with its root forwardly of the direction of its movement, and by operation of the carrier 29 each beet will be delivered to the floor or covered part of the circular platform radially thereof, the top or leaves being disposed outwardly of the rim 37 thereof while moved by the fingers 49 of the arms of the rotatable spindle 41.

The sleeves 55 on the three arms of the spider are caused to rotate so that their curved gripping fingers will be disposed above the surface of the platform at certain intervals, and at other intervals will swing below said platform. Each sleeve is provided with a lug 59, and when the spider is moved circularly in the direction of the arrow mentioned, said lug 59 will engage a bumper-member 60 which projects downwardly from the floor or cover 40, and by this operation the sleeve will be rotated approximately 90 degrees and its gripping-fingers 56 will be swung upwardly between the rods 38. Each sleeve is also provided with a second lug 61, and when the gripping-fingers, moving in the passageways 39 between the rods last mentioned are disposed in the radial plane of the knife 57 said lug 61 will engage a second buffer-member 62 which projects upwardly from the bottom of the circular platform which causes the gripping-fingers to swing downwardly approximately 90 degrees.

As thus described, the spider may have a rotatable movement, its hub having a loose mounting on the spindle and the gripping-fingers will be disposed in their lowermost position during the greater part of each complete circular movement of the spider. However, as soon as each lug 59 of a sleeve engages a buffer-member 60, the gripping-members of that sleeve will swing upwardly into the passageways 39 and will remain in said passageways until the lug 61 of said sleeve engages a buffer-member 62.

It will be understood that the function discharged by the spider is to provide means to co-operate with the fingers 49 for gripping the beets firmly at the time their tops or leaves are removed by the knife 57. In operation, as soon as each beet is delivered to the platform it is swept circularly toward the knife by the fingers of an arm 48. The beet will be pressed firmly between these fingers and the gripping-members 56 of a sleeve 55 of the spider and this pressure will be continued until the lug 61 of the sleeve engages the buffer 62 of the platform which causes a rotatable movement of the sleeve and a forward and downward swinging movement of the curved gripping-fingers as mentioned.

While it is true that the spider is mounted to permit a free circular movement on the spindle 41, the spider is heavy and resists circular movement in a degree sufficient for co-operation with the fingers 49 for gripping the beets firmly while their tops are moved into engagement with the knife.

When each beet is moved upwardly on the carrier-frame 26 and is moved into engagement with the buffer-member 58, the latter causes the leaves to lie in a more or less flat position, and, as above mentioned, each beet will be delivered to the circular platform with its leaves disposed outwardly of the circular edge thereof. However, if the leaves of a beet should not project outwardly of said edge it will be moved outwardly on account of the inclination of the platform coupled with centrifugal force. The rim 37 has a reduced or tapered end-portion $x$ which permits the leaves to slide upwardly upon said rim, and while the beet moves toward the knife its head will be pressed against the rim 37 with its leaves outwardly of the rim, and during operation, the leaf-springs 50 move the beets to advantage, so that their heads will engage the concave surface of the rim 37 as soon as the body of the beet is struck by said spring. Also since the springs have a yielding movement they tend to prevent any rolling movement of a beet while the latter is moved forwardly toward the knife or toward the gripping-members 56 of a sleeve 55.

It will be noted that the front wheels are disposed comparatively near to each other and that they are each provided at the inner sides of their tires with circular cutter-blades 63, these being for the purpose of removing some of the leaves from the beets while the vehicle moves forwardly.

Means are provided for lifting the plow from the ground, and at the same time elevating the vehicle frame, platform and front wheels from the ground at the time of "turning about" at the end of a field, and means are provided for steering the front wheels which will be explained.

Numeral 64 indicates a rock-lever or foot piece which is disposed transversely of the tongue 65 and has a pivotal mounting indicated at 66. Each front wheel has rotatable bearings on a stub-axle 67 upon which is mounted a steering post 68. At 69 are indicated a pair of control-bars each being mounted upon the top of a steering post, and at 70 are indicated a pair of links, each being connected at its front end to a control bar, its rear end being attached to an end of the rock-lever 64.

The rock-lever is disposed at the front of the seat 13, and on account of the construction as described, the driver will be able to steer the front wheels in such a manner that the plow will suitably engage the ground for dislodging the beets of a row.

Figure 5:
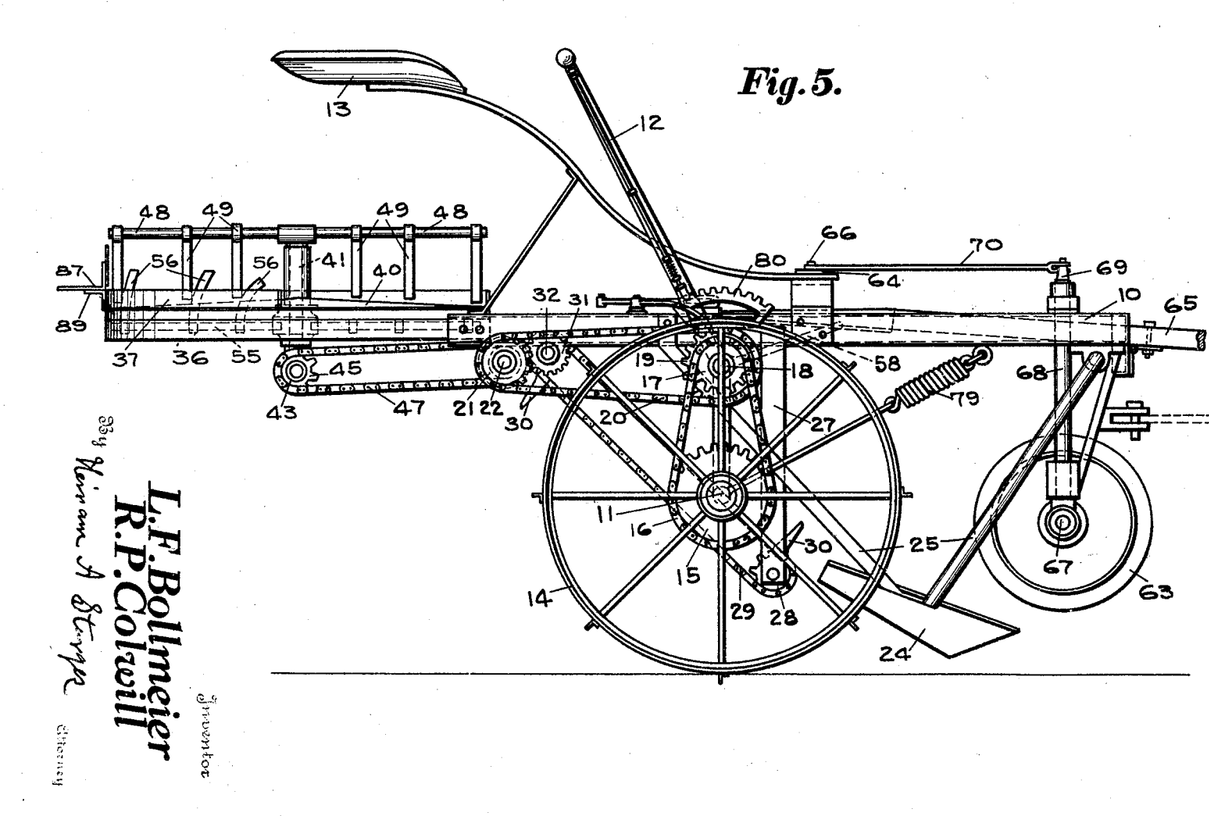
Fig. 5 is a side view of the machine, the plow being elevated.

The means for elevating the vehicle frame, the platform, together with the front wheels and plow to the position shown in Fig. 5 of the drawings consists of few and simple parts. The hand-lever 12 is rigidly mounted on the axle 11 and a rearward swinging movement of said lever will cause an upward swinging movement of the vehicle axle, the pairs of springs 79 being of assistance in this operation, one end of each spring being connected with that part of the axle adjacent to a rear wheel-hub and its opposite end being attached to the vehicle frame as clearly shown in the drawings. In this connection a toothed sector 80 is used and is engaged by a pawl of the hand-lever.

As above mentioned, the principal advantage in elevating the front wheels and plow from the ground is to permit the vehicle to be "turned about" at the ends of the rows of beets or end of a field.

To drop the plow to the ground together with the front wheels, the driver, after releasing the pawl of the lever from the toothed sector 80, causes the hand-lever to be swung forwardly against the force of the springs 79, said lever being secured as to position by use of the pawl and toothed sector.

During the operation of "turning about" at the ends of the beet-rows the carrier 29 will remain at rest and the spindle 41 will not rotate, for the reason that we provide means which operate automatically for disengaging the sprocket wheel 19 from the sprocket wheel 17 at the time of elevating the plow from the ground, said means also operating to move the sprocket wheel 19 into engagement with the sprocket wheel 17 when the plow is lowered to the ground.

Figure 1:
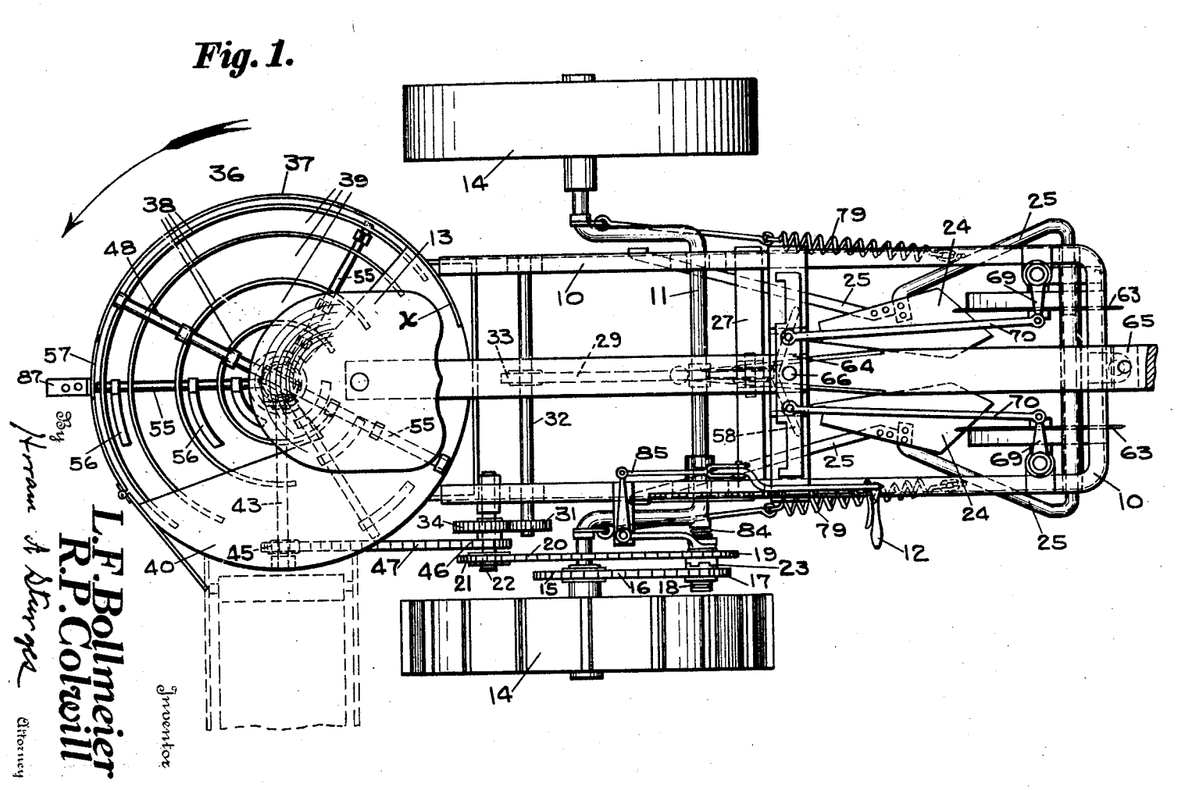
Fig. 1 is a plan view of the machine.
Figures 2, 3:
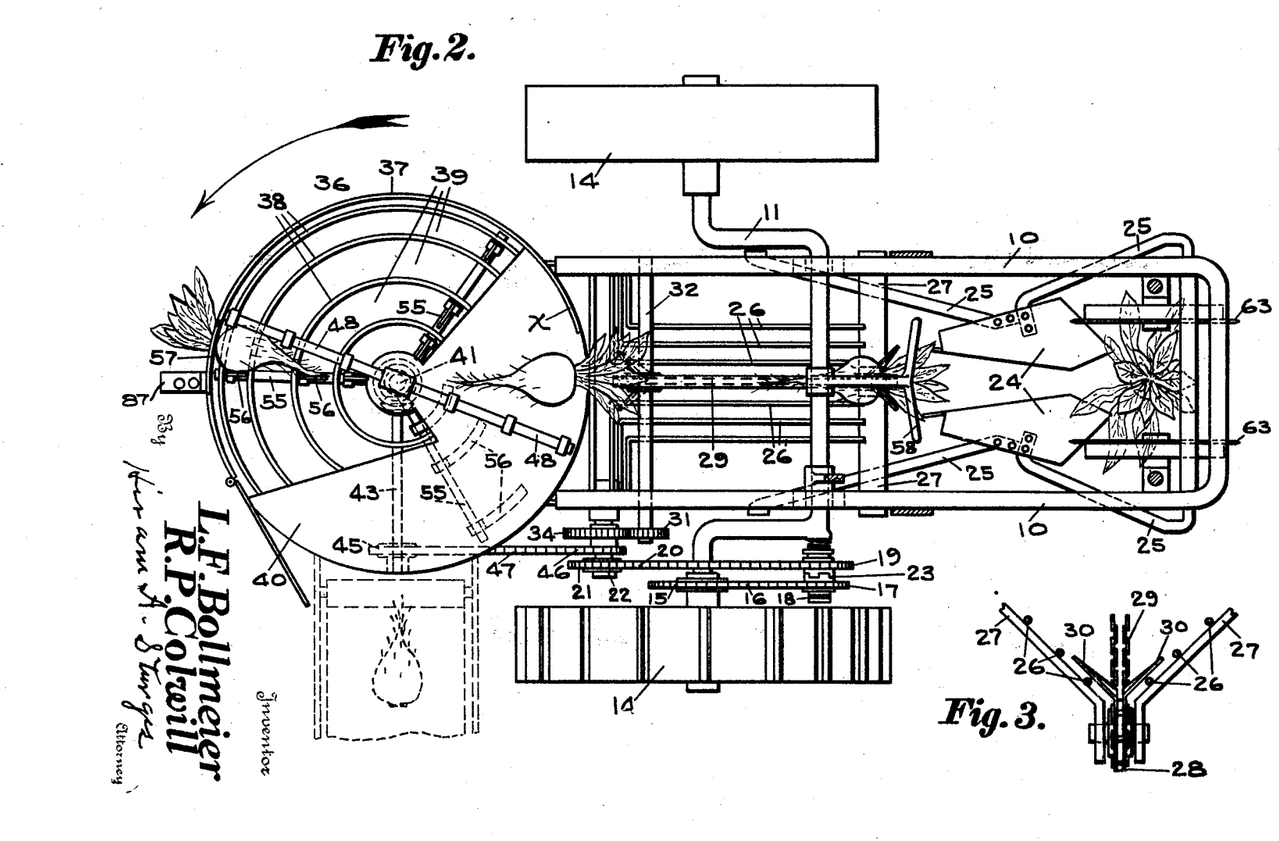
Fig. 2 is a plan view of the same, the driver's seat and tongue being removed.
Fig. 3 is a detail showing an end view of a beet-carrier.
Figure 4:
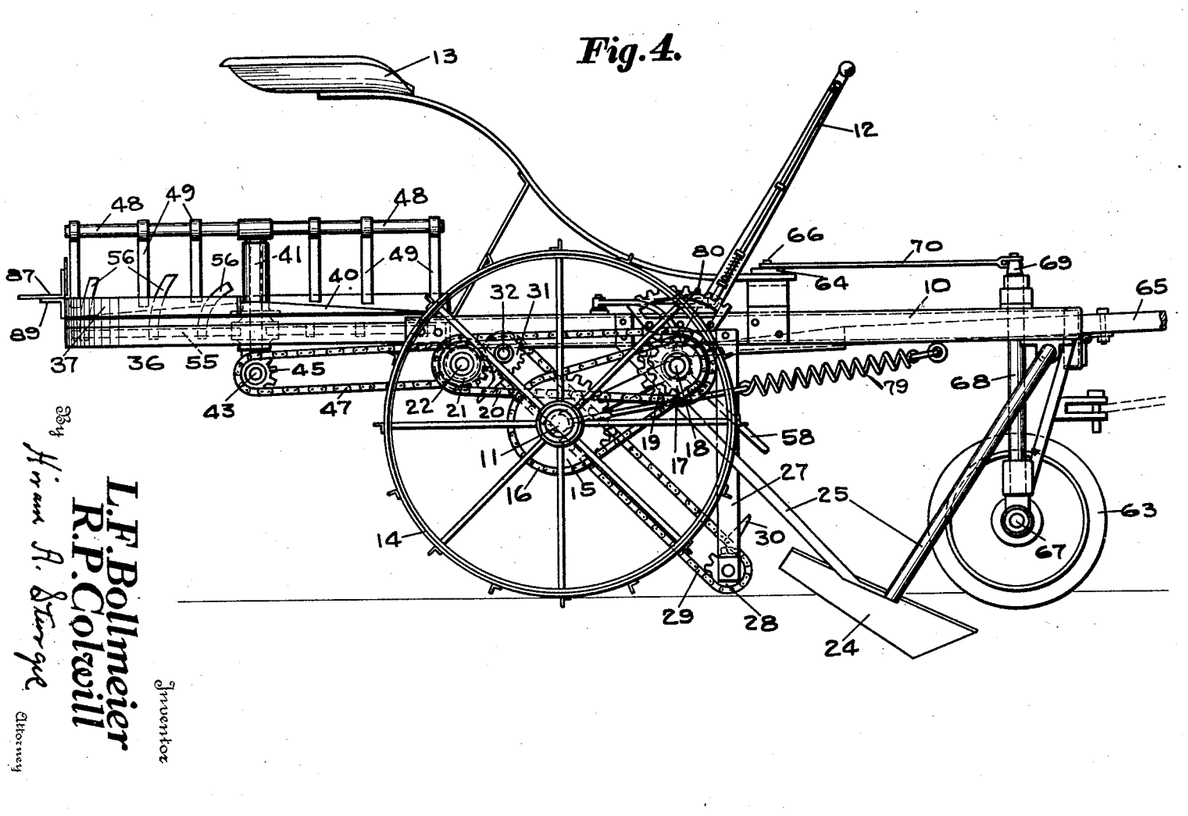
Fig. 4 is a side view of the machine, the plow being held in its lowermost position.
Figures 9, 10:
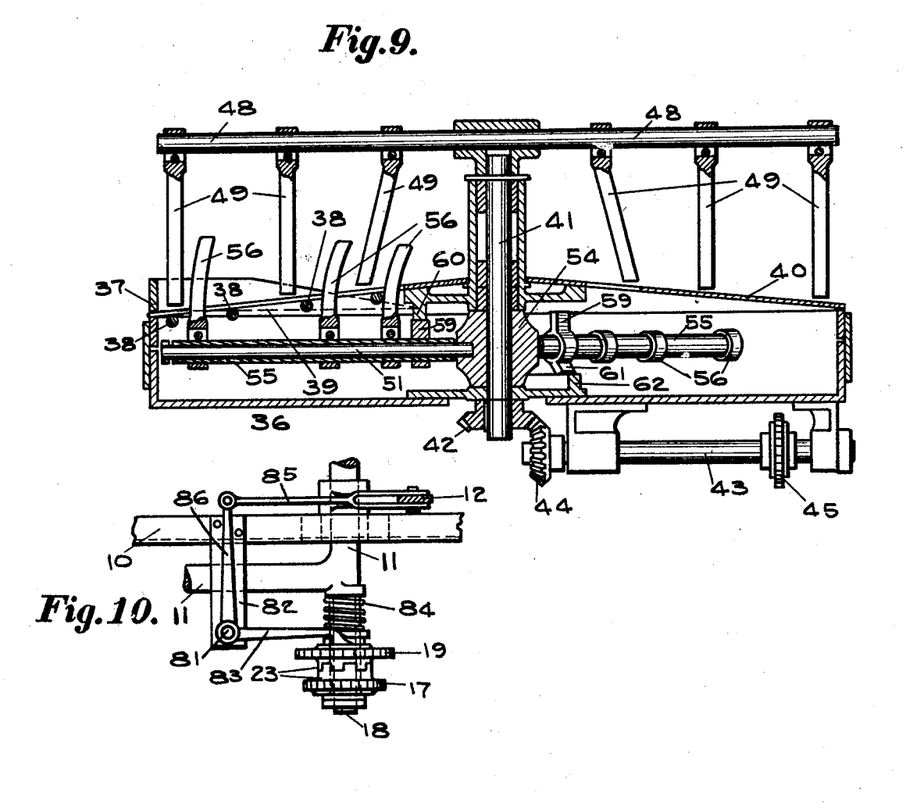
Fig. 9 shows a vertical section through the platform.
Fig. 10 is a broken away view showing the hand lever in section and a bell-crank operated by the lever for automatic control of a clutch.

By referring to Figs. 1 and 10 it will be seen that a bell crank is provided, its pivotal mounting being indicated at 81 upon a bracket 82 which is secured to the vehicle frame. An arm 83 of the bell crank is connected with the hub of the sprocket wheel 19 and is normally pressed against said wheel by means of a spring 84 which is mounted on the stub-shaft 18. A link 85 connects the arm 86 of the bell crank with the hand lever 12.

As thus described it will be seen that no attention of a driver is required and that a rearward swinging movement of the hand lever will terminate operation of the driving mechanism while the vehicle is moving, and that the forward swinging movement of the hand lever which operates to lower the plow and front wheels also moves the sprocket wheel 19 into engagement with the sprocket wheel 17 for actuation of the driving mechanisms, the spring 84 operating to maintain said wheels in engagement.

Figures 6, 7, 8:
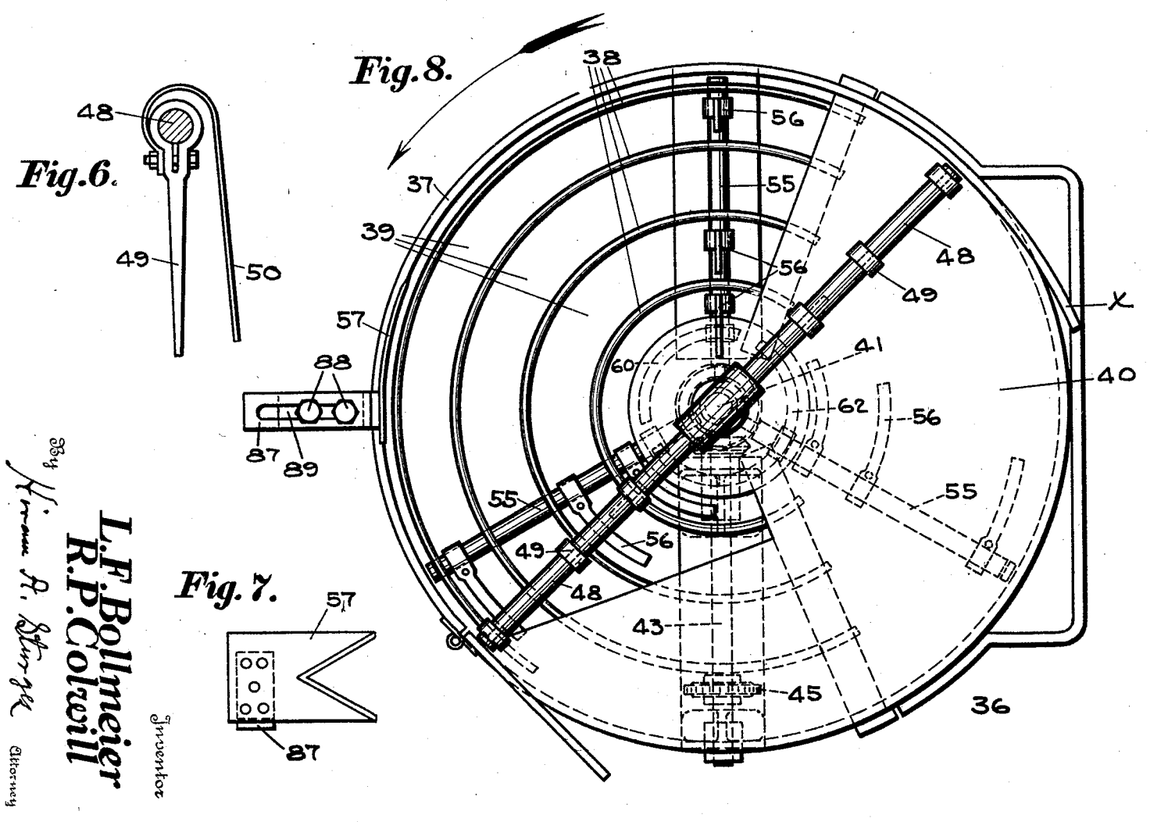
Fig. 6 shows a spindle-arm in section provided with a finger and spring.
Fig. 7 is a side view of a knife.
Fig. 8 is a plan view of a circular platform.

As best shown in Fig. 7 of the drawing, the knife 57 is provided with a V-shaped recess, the walls of said recess providing the outwardly divergent cutting edges for removing the tops or leaves of the beets when the latter swing circularly as mentioned. In order that the knife may be adjusted and may be maintained at selected distances from the stop-rim 37 it is provided with a shank 87 having a slot and by means of suitable keepers 88 which engage in a bracket 89 and in said slot, the knife may be adjusted as mentioned.

We claim as our invention,—

1. In a beet harvesting machine, a movable vehicle, a circular platform having a cone-shaped surface and mounted on the vehicle, a spindle traversing and projecting above the platform, a circular stop-rim concentric with the spindle and projecting above the platform, a knife mounted on the stop-rim, a spider provided with fingers and mounted as an idler on the spindle, a movable inclined carrier for delivering beets to the platform, and a pair of arms provided with fingers and movable with the spindle, said spindle being revoluble for moving the beets on the platform against the fingers of the spider and into engagement with said knife.

2. In a beet harvesting machine, a movable vehicle, a platform on the vehicle, an upright spindle projecting above the platform, an upright stop-rim concentric with the spindle and secured to the platform, a knife connected with and adapted to be adjusted to positions nearer to or further from said rim, a spider mounted as an idler on the spindle and including a hub, radially disposed arms carried by the hub and sleeves on said arms each provided with curved fingers, horizontal arms secured to the spindle each provided with downwardly projecting fingers, a carrier for conducting beets to the platform, said spindle being rotatable to cause the beets to be gripped between the fingers of the spider and fingers of said horizontal arms and to cause the beets to be conducted into engagement with said knife.

3. In a beet harvesting machine, a movable vehicle, a circular platform on the vehicle, an upright circular rim secured to the platform and having an inclined end-portion, an upright spindle centrally of and extending above the platform, a knife on said upright rim, a carrier for moving the beets to said platform, a spider mounted as an idler on the spindle and having arms provided with fingers, a pair of horizontal arms secured to the spindle and provided with fingers, said spindle being rotatable to cause the fingers of its arms to move the beets upon the platform and upright rim and the inclined end-portion thereof and to move said beets into engagement with the fingers of the spider and into engagement with said knife.

4. In a beet harvesting machine, a movable vehicle, a platform on the vehicle, an inclined carrier for moving beets upwardly to the platform, a stationary buffer-member for engaging the beets during their upward movements, a spindle in bearings extending above the platform, a rim concentric with the spindle and secured to the platform, a knife secured to said rim, a spider mounted as an idler on the spindle and provided with fingers, a pair of horizontal arms secured to the spindle and provided with fingers, said spindle being rotatable for gripping the beets between the fingers of the spider and fingers of said horizontal arms and for conducting said beets into engagement with said knife.

5. In a beet harvesting machine, a movable vehicle, a circular platform on the vehicle, a spindle centrally of and extending above the platform, a rim on the platform concentric with the spindle, a knife on said rim, a spider mounted as an idler on the spindle and provided with fingers, a pair of opposed arms secured to the spindle, a plurality of fingers each provided with a leaf-spring and secured to the arms of the spindle, said spindle being rotatable for gripping the beets between the fingers of the spider and fingers of the opposed arms of the spindle and for moving the beets into engagement with said knife.

6. In a beet harvesting machine, a movable vehicle, a platform upon and secured stationary with the vehicle, a journalled spindle extending above the platform, an arm secured to the spindle and extending radially therefrom and provided with downwardly projecting fingers, an upright stop-rim concentric with the spindle and secured to the platform, a knife mounted upon and arranged to be adjusted to distances nearer to or further from the stop-rim, a buffer-member on the vehicle, and a carrier for moving the beets into engaged relation with the buffer-member and delivering said beets to the platform, said spindle being rotatable to permit the fingers of its arm to move the beets on the platform into engagement with said knife.

7. In a beet harvesting machine, a movable vehicle, a circular platform on the vehicle, an upright spindle extending above the platform, a stop-rim concentric with the spindle and secured to the platform, a knife adapted to be adjusted to positions radially of the platform and secured to the stop-rim, a carrier movable for delivering beets to the platform, a spider having journalled bearings and provided with curved fingers, a pair of opposed arms movable with the spindle and provided with downwardly projecting fingers, said spindle being revolvable for moving the beets against the fingers of the spider and into engagement with said knife.

In testimony whereof, we have affixed our signatures.

LOUIS F. BOLLMEIER.
RICHARD P. COLWILL.